US011662765B1

(12) United States Patent
Nagarajan et al.

(10) Patent No.: US 11,662,765 B1
(45) Date of Patent: May 30, 2023

(54) SYSTEM FOR PROVIDING A LOW LATENCY AND FAST SWITCHED CASCADED DUAL PHASED LOCK LOOP (PLL) ARCHITECTURE FOR DIE-TO-DIE / SYSTEM-ON-CHIP (SOC) INTERFACES

(71) Applicant: QUALCOMM INCORPORATED, San Diego, CA (US)

(72) Inventors: Mahalingam Nagarajan, San Diego, CA (US); Vaishnav Srinivas, Oceanside, CA (US); Christophe Avoinne, San Diego, CA (US); Xavier Loic Leloup, San Diego, CA (US); Michael David Jager, Camberley (GB)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/574,722

(22) Filed: Jan. 13, 2022

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC .................................... G06F 1/12; G06F 1/08
See application file for complete search history.

(56) References Cited

U.S. PATENT DOCUMENTS

| 6,201,448 | B1 * | 3/2001 | Tam ........................ H03L 7/06 331/25 |
| 8,095,813 | B2 * | 1/2012 | Pernia .................... H03K 3/354 713/323 |
| 8,692,595 | B1 * | 4/2014 | Mendel .................. H03L 7/099 327/147 |
| 2010/0135378 | A1 * | 6/2010 | Lin ....................... H04L 7/0058 375/232 |
| 2019/0179397 | A1 * | 6/2019 | Lee ........................ G06F 1/3206 |
| 2023/0049681 | A1 * | 2/2023 | Chromczak ............. H01L 24/14 |

* cited by examiner

*Primary Examiner* — Zahid Choudhury
(74) *Attorney, Agent, or Firm* — Smith Tempel Blaha LLC/Qualcomm (57) ABSTRACT

A method for providing low latency frequency switching includes operating a first processing component on a first die and operating a second processing component on a second die with the same first clock signal having a first frequency. A request to switch the first frequency to a second, new frequency is received and a second clock signal having the second, new frequency is produced. Data flow between the first die and second die may be stopped. And then the second clock signal is transmitted to a dual phased locked loop architecture on a die interface. A PCLK signal is created from the combined first and second clock signals and an NCLK signal is created from the second clock signal. Next, the PCLK signal is divided and aligned with the NCLK signal. Once the PCLK signal is aligned with the NCLK signal, data flow is resumed between the two dies.

30 Claims, 5 Drawing Sheets

SYSTEM FOR PROVIDING A LOW LATENCY AND FAST SWITCHED CASCADED DUAL PHASED LOCK LOOP (PLL) ARCHITECTURE FOR DIE-TO-DIE / SYSTEM-ON-CHIP (SOC) INTERFACES

DESCRIPTION OF THE RELATED ART

A computing device may include multiple subsystems, cores or other components. Such a computing device may be, for example, a portable computing device ("PCD"), such as a laptop or palmtop/hand-held computer, a cellular telephone or smartphone, portable digital assistant, portable game console, a tablet personal computer (PC), etc.

The multiple subsystems, cores or other components of a computing device may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as memory devices, like double-data rate (DDR) dynamic random access memory (DRAM), as well as transceiver or "modem" subsystems that provide wireless connectivity.

Often, a PCD may have multiple SoCs which are positioned adjacent to each other and are often stacked on top of each other. These SoCs within a PCD are often connected together and such connections between SoCs are referred to as die-to-die (D2D) interfaces. Further, an SoC, depending on the PCD may be physically divided into two or more layers and may requires two or more D2D interfaces.

A typical application of D2D interfaces at the physical layer (PHYs) in a divided SoC and/or multiple SoCs is a connection between Network-on-Chip (NoC) fabrics. These connections typically exist between chiplet D2D interface layers at the PHYs layer. Exemplary D2D PHYs include Peripheral Component Interconnect Express (PCIE) connections that support double-data-rate (DDR) memory devices, such as Dynamic Random Access Memory (DRAM).

These physical connections between chiplet D2D layers require extremely low latency because these connections may carry or support data traffic (i.e. memory traffic) to and from memory devices, such as DRAM. These connections may have a direct impact on performance. Additionally, these physical layers (PHYs) often need to support changes in clock frequencies to support functions, such as Dynamic Voltage and Frequency Scaling (DVFS) for power/performance scaling.

DVFS often requires a very low stall time during frequency switches/changes such that data traffic disruptions can be avoided or minimized. Conventional devices that try to address these requirements of DVFS often require clock domain crossing (CDC) First-In-First-Outs (FIFOs) at the PHY-NoC interface to decouple the frequency of the PHY (physical layer) from NoC-fabrics. However, these CDC FIFOs usually add several cycles of latency (6-8 nanoseconds) to a round-trip for data management in addition to increasing the overall Failures-in-Time (FIT) rate of the product. CDC FIFOs are also asynchronous.

Accordingly, there is a need in the art for a D2D interface that supports DVFS without CDC FIFOs and that may reduce latency during the switch in frequency and/or voltage and which does not substantially increase power consumption of the overall system while also minimizing a FIT rate for a PCD.

SUMMARY OF THE DISCLOSURE

Systems, methods, computer-readable media, and other examples are disclosed for providing low latency frequency switching between two dies in a computing device. A method for providing low latency frequency switching between two dies within a computing device may include operating a first processing component on a first die with a first clock signal at a first frequency and operating a second processing component on a second die with the first clock signal at the first frequency. Next, a second clock signal having a second, new frequency may be generated. Subsequently, a third signal from the first and second clock signals and having the second, new frequency. Next, the first and second clock signals may be combined with a dual phased locked loop architecture in a die interface. And a fourth signal may be produced from the combined first and second clock signals resulting from the dual phased locked loop architecture. Next, a phase of the fourth signal may be aligned with the third signal.

A system for providing low latency frequency switching between two dies within a computing device may include a first processing component operating on a first die with a first clock signal at a first frequency and a second processing component operating on a second die with the first clock signal at the first frequency. The system may further include a means for generating a second clock signal having a second, new frequency and a means for creating a third signal from the first and second clock signals and having the second, new frequency. The system may further have a dual phased locked loop architecture that combines the first and second clock signals in a die interface. And the system may also include means for creating a fourth signal from the combined first and second clock signals resulting from the dual phased locked loop architecture. The system may further have means for aligning a phase of the fourth signal with the third signal.

A system for providing low latency frequency switching between two dies within a computing device may have a first processing component operating on a first die with a first clock signal at a first frequency and a second processing component operating on a second die with the first clock signal at the first frequency. A first dual phased locked loop architecture outside of a die interface may generate a second clock signal having a second, new frequency. A device may create a third signal from the first and second clock signals and having the second, new frequency. And a second dual phased locked loop architecture in the die interface may combine the first and second clock signals and create a fourth signal. The second dual phased locked loop architecture may align a phase of the fourth signal with the third signal.

A system for providing low latency frequency switching between two dies within a computing device may have a first processing component operating on a first die with a first clock signal at a first frequency and a second processing component operating on a second die with the first clock signal at the first frequency. A first device may generate a second clock signal having a second, new frequency. And a second device may create a third signal from the first and second clock signals and having the second, new frequency. And a dual phased locked loop architecture in a die interface may combine the first and second clock signals and create a fourth signal. The dual phased locked loop architecture may align a phase of the fourth signal with the third signal.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
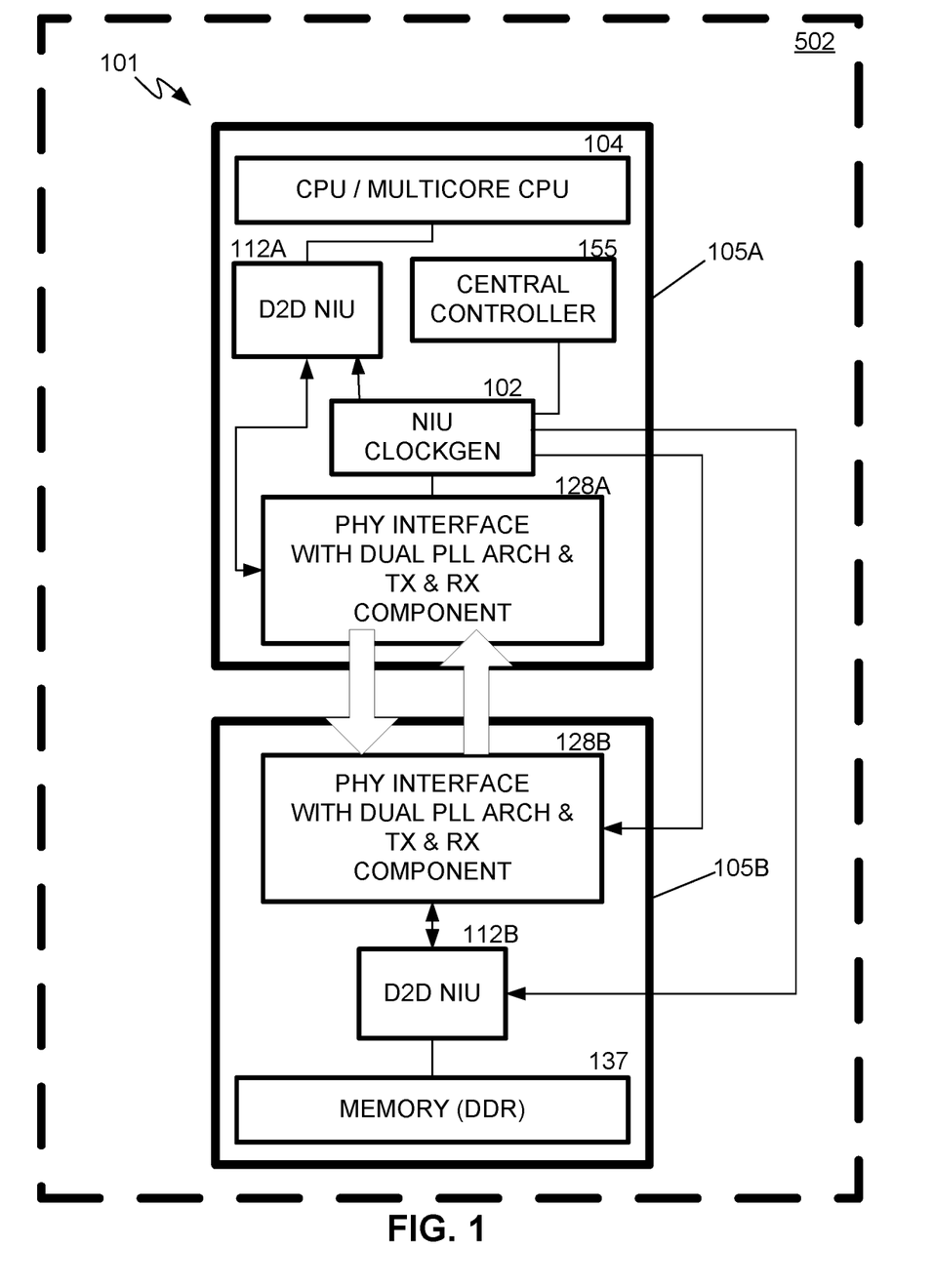
FIG. 1 illustrates a system for providing a low latency and fast switched cascaded dual phased lock loop (PLL) architecture for die-to-die (D2D)/system-on-chip (Soc) interfaces.

Referring now to FIG. 1, this figure illustrates a system 101 for providing a low latency and fast switched cascaded dual phased lock loop (PLL) architecture for die-to-die (D2D)/system-on-chip (Soc) interfaces. The system 101 may comprise a first die 105A and a second die 105B that may be positioned on a SoC 502. The first die 105A may have a first processing component 104 (i.e. a central processing unit (CPU)), a central controller 155, a Network Interface Unit (NIU) clock generator (Clockgen) 102, a first Die-to-Die Network Interface Unit (D2D NIU) 112A, and a first physical layer interface (PHY) 128A which has a transmitting and receiving (TX & RX) processing component. The first PHY 128A has a dual phased-locked loop (DLL) which will be described in further detail below in connection with FIG. 2.

The second die 105B may have a second physical layer interface (PHY) 128B that also has a transmitting and receiving (TX & RX) processing component. Like the first PHY 128A, the second PHY 128B also has a dual phased-locked look (DLL), which is also described below in connection with FIG. 2. The second die 105B has a second D2D NIU 112B and a second processing component 137. The second processing component 137 may comprise a memory device, such as, but not limited to DDR DRAM.

The first and second PHYs 128A, 128B support the data communications between the first die 105A and second die 105B as shown by the two large arrows between the dies 105. The central controller 155 may issue commands to the NIU clockgen 102 in order to change an operating frequency of the two dies 105. Such commands may be made in connection with a new frequency to support a Dynamic Voltage and Frequency Scaling (DVFS) event for power/performance scaling of the two dies 105.

As understood by one of ordinary skill in the art, DVFS is a commonly-used power-management technique where the clock frequency of a processor may be decreased to allow a corresponding reduction in the supply voltage. This reduces power consumption, which can lead to significant reduction in the energy required for a computation, particularly for memory-bound workloads.

The NIU clockgen 102, in response to the commands from the central controller 155, may generate a new clock signal that is shared with the D2D NIUs 112A, 112B and the PHYs 128A, 128B. The NIU clockgen 102 may also stop data flow between the NIUs 112 and the PHYs 128.

The new clock signal may have a different operating frequency compared to the present operating frequency of the two dies 105. Once the PHYs 128 make sure that the new clock signal has been received and matches the new clock signal sent to the D2D NIUs 112 by using the phased-locked-loop architecture, the NIU clockgen 102 may have data communications resume between the D2D NIUs 112 and PHYs 128, which, in turn, allows data communications to resume between the two PHYs 128 across the two dies 105.

The system 101 is designed to support communications between the first processing component 104 on the first die 105A and the second processing component 137 on the second die 105B. The first processing component 104 and second processing component may be changed/switched from their respective dies 105 without departing from the scope of this disclosure. Further, either processing component 104, 137 may comprise: a central processing unit ("CPU"), that includes multi-core CPUs; a graphics processing unit ("GPU"); a digital signal processor ("DSP"); a neural processing unit ("NPU"); a memory unit, such as DDR DRAM, SDRAM, etc., and any combination thereof.

Figure 2:
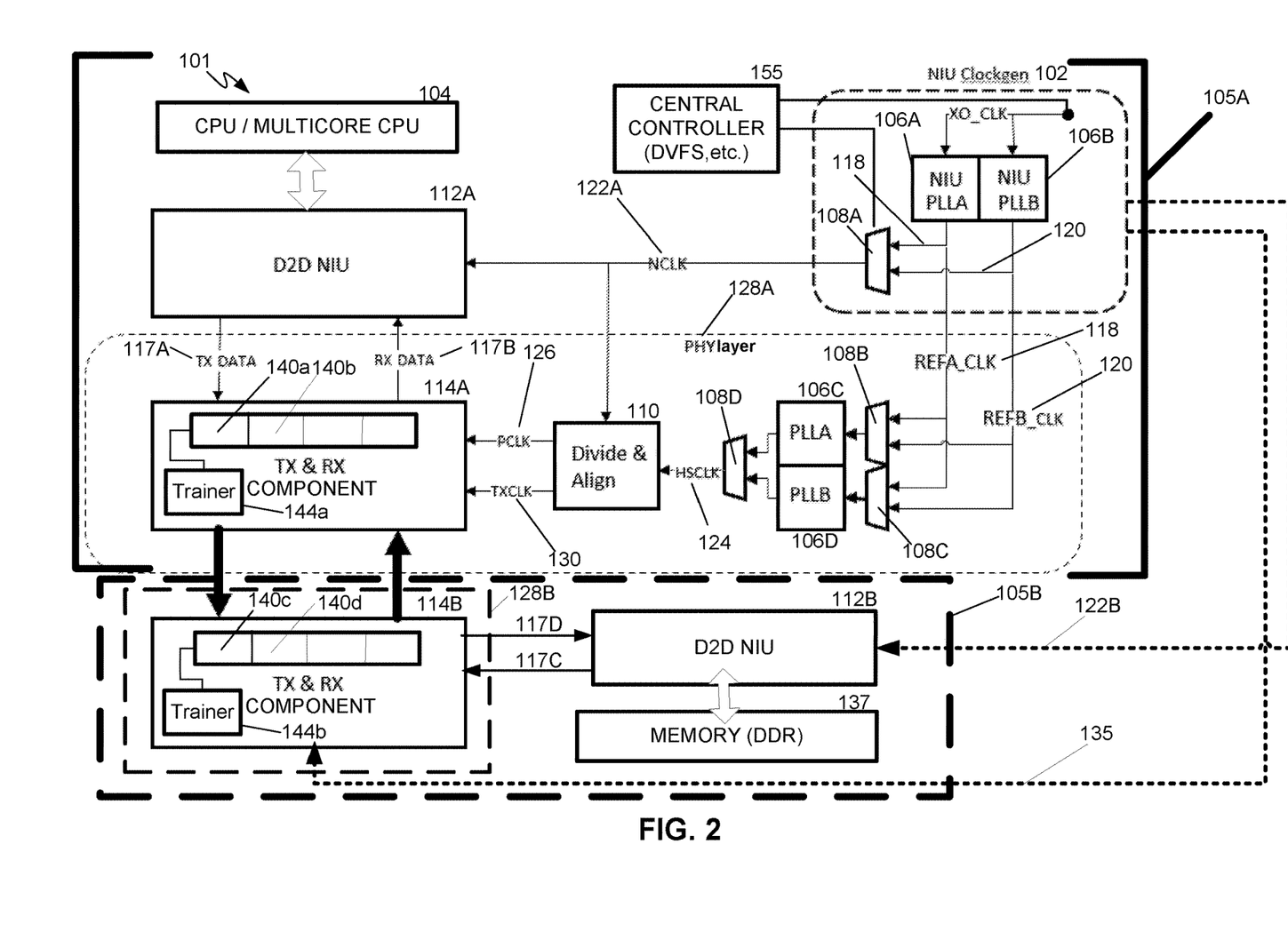
FIG. 2 illustrates additional details of the NIU Clockgen and PHY of the system presented in FIG. 1.

Referring now to FIG. 2, this figure illustrates additional details of the NIU Clockgen 102 and PHY 128 of the system 101 presented in FIG. 1. As shown in FIG. 2, the NIU Clockgen 102 may comprise dual NIU phased-locked-loops (NIU PLLA, NIU PLLB) 106A, 106B. The first NIU PLLA 106A produces a first clock signal REFA_CLK 118 that is sent to a first multiplexer 108A, a second multiplexer 108B, and a third multiplexer 108C. The second NIU PLLB 106B produces a second clock signal REFB_CLK 120 which is also sent to the first multiplexer 108A, the second multiplexer 108B, and the third multiplexer 108C.

The first clock signal REFA_CLK 118 has a first frequency, while the second NIU PLLB 106B generates the second clock signal REFB_CLK 120 at a second frequency. Generally, the D2D NIU 112A, the processing component 104, and the first PHY 128A are operating at one frequency according to either the first clock signal REFA_CLK 118 or the second clock signal REFB_CLK 118.

The first multiplexer 108A, second multiplexer 108B, and third multiplexer 108C are controlled by the central controller 155, such as a DVFS controller that is used to conserve power for a PCD. The NIU Clockgen 102 may support the timing and may be the clock signal generator for a plurality of PHYs 128 located on different dies 105, such as PHY 128B located on second die 105B shown in FIG. 2 (and shown in FIG. 1).

Suppose the first processing component 104, first D2D NIU 112A, and first PHY 128A are operating at a first frequency that is directed by the first clock signal REFA- _CLK 118 produced by the first NIU PLLA 106A. The central controller 105 may issue commands to the NIU clockgen 102 to have the second NIU PLLB 106B create a second clock signal REFB_CLK 120 which has a second frequency different than the first frequency. The central controller 105 may also issue commands to the first D2D NIU 112A to stop the data traffic 117A, 117B between the first D2D NIU 112A and the transmission and receive component 114A of the first PHY 128A.

As noted previously the first clock signal REFA_CLK 118 and second clock signal REFB_CLK 120 are both fed into the first, second and third multiplexers 106A, 106B, 106C. The first multiplexer 108A produces the NCLK signal 122A. The NCLK signal 128 may be referenced as the third signal mentioned below.

The two multiplexers 108B, 108C in the PHY 128A which are before the dual phased locked loop 106C, 106D may be controlled by test logic as understood by one of ordinary skill in the art. Further, an additional signal line (not shown in FIG. 2) may be employed and fed into each multiplexer 108B, 108C. The additional signal line fed into each multiplexer 108B, 108C may couple each PLLA 106C, PLLB 106B to an external oscillator clock (not shown). The external oscillator clock may be used for testing the circuitry of the PHY 128A as understood by one of ordinary skill in the art. The external oscillator clock may allow the PLLA 106C, PLLB 106D to lock should there be any issues with the REFA_CLK signal 118 line and/or the REFB_CLK signal 120 line.

The output of the second and third multiplexers 108B, 108C of the PHY 128A is fed into a second-set of dual phased locked-loops (PLLA 106C, PLLB 106D). The first PLLA 106C may have a different locking range compared to the locking range of the second PLLB 106D. The output of multiplexers 108B and 108C are generally provided as a reference clock signal for PLLA 106C and PLLB 106D respectively.

The output of the second-set of dual PLLs PLLA 106C, PLLB 106D is fed into a third multiplexer 108D. That is, high frequency output clock signals from PLLA 106C and PLLB 106D are fed into the multiplexer 108D. The output of this third multiplexer 108D is a clock signal HSCLK 124 which is fed into a divide & align logic block 110. The clock signal HSCLK 124 is a high frequency, high quality source clock used by the PHY 128A for transmitting and receiving data.

From the NCLK clock signal 122A and the HSCLK clock signal 124, the divide & align logic produces a PCLK signal 126 and a TXCLK signal 130. Specifically, both the PCLK signal 126 and TXCLK signal 130 are derived from the HSCLK clock signal 124. The PCLK signal 126 is a divided version of the HSCLK clock signal 124 with a divide ratio matching the PLL 106C/106D multiplier ratio. In other words, the PCLK signal 126 is produced by dividing HSCLK clock signal 124 and aligning it with the phase of the NCLK clock signal 122A. The PCLK signal 126 may be referred to as the fourth signal described below.

Meanwhile, the TXCLK signal 130 is a delayed version of the HSCLK clock signal 124. Thus, the TXCLK signal 130 is the undivided version of the PCLK signal 126.

The divide & align logic block 110 aligns the PCLK signal 126 with the NCLK signal 122A. Specifically, the divide & align logic block 110 may align the phase between the clock signal PCLK 126 with the clock signal NCLK 122A. The divide & align logic block 110 may comprise a phase detector and a digital delay-locked-loop (DLL) as understood by one of ordinary skill in the art. Any circuitry which may adjust for the phase difference between the clock signal PCLK 126 and the signal NCLK 122A may be employed within the divide & align logic block 110 as understood by one of ordinary skill in the art.

Once the phase of clock signal PCLK 126 matches the phase of the clock signal NCLK 122A, then data traffic 117A, 117B may resume between the first D2D NIU 112A and the transmission and receiver component 114A of the first PHY 128A. While the divide & align logic block 110 is aligning the phases between the PCLK signal 126 and NCLK signal 122A, the transmission and receiver component 114A of the first PHY 128A may make preparations for a new data rate which is in line with the new frequency of the PCLK signal 126 and NCLK signal 122A.

The transmitting and receiving (TX & RX) processing component 114 of the PHY 128A may comprise any one or a plurality of die-to-die (D2D) Physical (PHY) communication processing components. The TX & RX processing component 114 may comprise a serializer/de-serializer circuit. The TX & RX processing component 114 may be bought off-the-shelf as a High-Bandwidth Interconnect (HBI) PHY IP as of this writing. The D2D NIU 112 may be part of this off-the-shelf product. Other D2D NIUs 112 and TX & RX processing components 114 are possible and are included within the scope of this disclosure.

The TX & RX processing component 114 may further comprise D2D PHY training registers 140a, 140b. These registers 140a, 140b allow the TX & RX processing component 114 to support a new data rate when there is a change in frequency for the Pclock signal 126 described above. The registers 140a, 140b may be coupled to a trainer circuit block 144a.

The training registers 140 may hold clock and data skew settings that need to be updated with a frequency change. The registers 140 may also contain transmitter and receiver impedance settings and also any other circuit setting that needs to be changed to support new frequency.

The trainer circuit block 144A may support clock data recovery functions for the registers 140 as understood by one of ordinary skill in the art. The trainer circuit block 144A may help with a new frequency of operation before the new frequency may be enabled and supported by the registers 140 and the entre TX & RX processing component 114.

Once the D2D PHY training registers 140a, 140b have been trained and once the PCLK signal 126 is aligned with the NCLK signal 122A, then the TX & RX processing component 114 and D2D NIU 112A are operating at the same, new frequency. Subsequently, data traffic 117A, 117B may resume between the first D2D NIU 112A and the first TX & RX component 114A of the first PHY 128.

The D2D NIUs 112 of each die 105 control the rate at which data traffic propagates into and out of the PHYs 128 to support data communications among and between the PHYs 128A, 128B. The PHYs 128A, 128B may be on separate dies 105A, 105B within a single PCD as illustrated in FIGS. 1-2.

Referring now to the lower section of FIG. 2 which illustrates the second die 105B. The second die 105B corresponds with the lower, second die 105B illustrated in FIG. 1. The second die 105B has several components which are identical to the first die 105A. However, in the second die 105B, there is no NIU clockgen 102, since the NIU clockgen 102 of the first die 105A controls the second D2D NIU 112B of the second die 105B, and any other additional dies 105 (i.e. 105N, 105N+1, 105N+2, etc., not shown).

The NIU Clockgen 102 of the first die 105A may be coupled to the both the second D2D NIU 112B and the second TX & RX processing component 114B via signal lines 122B and 135. Signal line 122B may be substantially similar or identical to the signal line 122A shown in connection with the first D2D NIU 112A of the first die 105A mentioned above. Similarly, the signal line 135 may comprise a plurality of signal lines/traces which are substantially similar or identical to signal lines 118, 120 which couple the NIU Clockgen 102 to the first PHY 128A. Discrete details for signal line 135 are not shown for brevity as understood by one of ordinary skill in the art.

As noted above in connection with FIG. 1, the processing component 137 of the second die 105A may comprise a memory unit such as DDR DRAM. However, other processing components, besides a memory unit, are possible and are included within the scope of this disclosure. Other processing components may include, but are not limited to, CPUs, GPUs, NPUs, DSPs, etc.

And lastly, while the PHY 128B of the second die 105B is only shown to have a TX & RX component 114B, the PHY 128B of the second die 105B has all of the multiplexers 108B, 108C, 108D as well as the dual PLLA, PLLAB 106C, 106D in addition to the divide & align logic 110 noted previously. However, these elements of PHY 128B have not been illustrated in FIG. 2 for brevity.

The dual PLLs 106C, 106D and divide & align component 110 present in each PHY 128A, 128B eliminate the need for synchronous and/or asynchronous first-in-first-out (FIFOs) on or within the TX & RX processing components 114A, 114B. That is, the TX & RX processing component 114 does not need any FIFOs to align the phases between the PCLK signal 126 and the NCLK signal 122A. As understood by one of ordinary skill in the art, FIFOs within TX & RX processing components 114 typically add to latency or lag time when switching between two frequencies generated by the NIU Clockgen 102.

Figure 3:
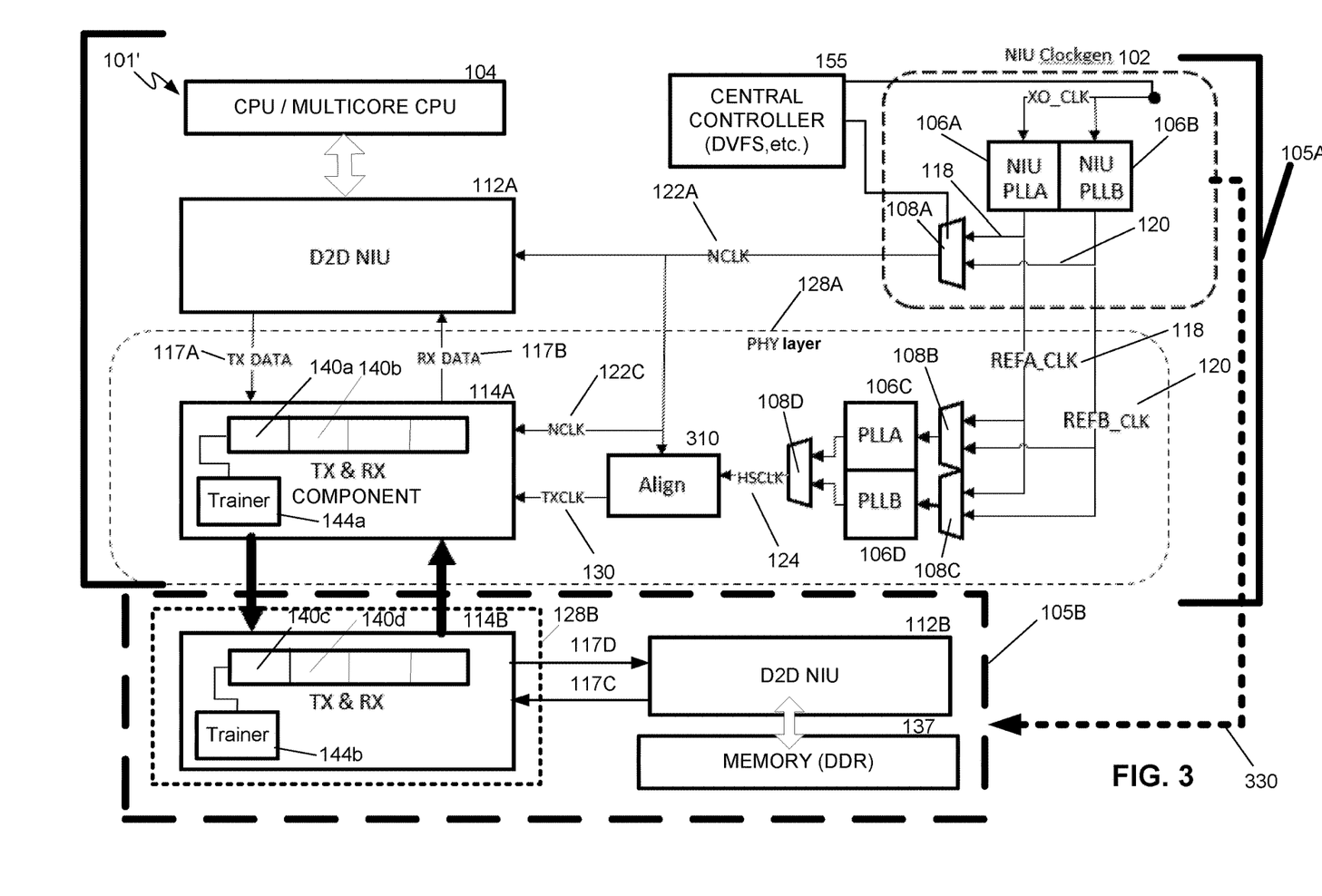
FIG. 3 illustrates a variation of the PHY within the system that is illustrated in FIG. 2.

Referring now to FIG. 3, this figure illustrates a variation of the PHY 128 within the system 101 that is illustrated in FIG. 2. FIG. 3 is substantially similar to FIG. 2 except for a few differences. Only the differences between FIG. 2 and FIG. 3 will be described here.

In FIG. 3, the system 101' includes the NCLK signal 122 which is directly fed into an align component 310 as well as directly (NCLK 122C) into the TX & RX processing component 114A. This align component 310 aligns the transmission clock TXCLK signal 130 with the NCLK signal 122. The align component 310 of FIG. 2 is substantially similar to the divide & align component 110 of FIG. 1, except that the align component 310 does not divide the NCLK signal 122A.

The align component 310 may adjust for skew that may exist between the NCLK signal 122 and the transmission clock TXCLK signal 130. That is, the align component 310 may skew balance the transmission clock TXCLK signal 130 so that it matches the NCLK signal 122A/122C. The TXCLK signal 130 of FIG. 3 may be referred to as the fourth signal (similar to the PCLK signal 126 of FIG. 2).

The align component 310 of FIG. 3 may be used instead of/substituted for the divide & align component 110 of FIG. 2 if the clock connections (clock lines 118, 120, 122 are) are physically too long or the PHY 128 is too long or too big relative to the PCD in which the system 101 is contained/housed. The align component 310 of FIG. 3, similar to the divide & align component 110 of FIG. 2, eliminates any need for FIFOs in the TX & RX processing component 114. FIFOs typically consume power, area, and add to latency when switching between frequencies as understood by one of ordinary skill in the art.

Between the NIU Clockgen 102 and the second die 105B of FIG. 3 there is a single communication line 330 illustrated with a dashed line. This communication line 330 may comprise the NCLK signal line 122A, first clock signal REFA_CLK 118, and second clock signal REFB_CLK 120. These three signal lines (shown in FIG. 2) are not shown in FIG. 3 for brevity. These lines 118, 120, 122A are coupled to the D2D NIU 112B and second and third multiplexers 108B, 108C (not shown) similar to those shown in FIG. 2.

Figure 4:
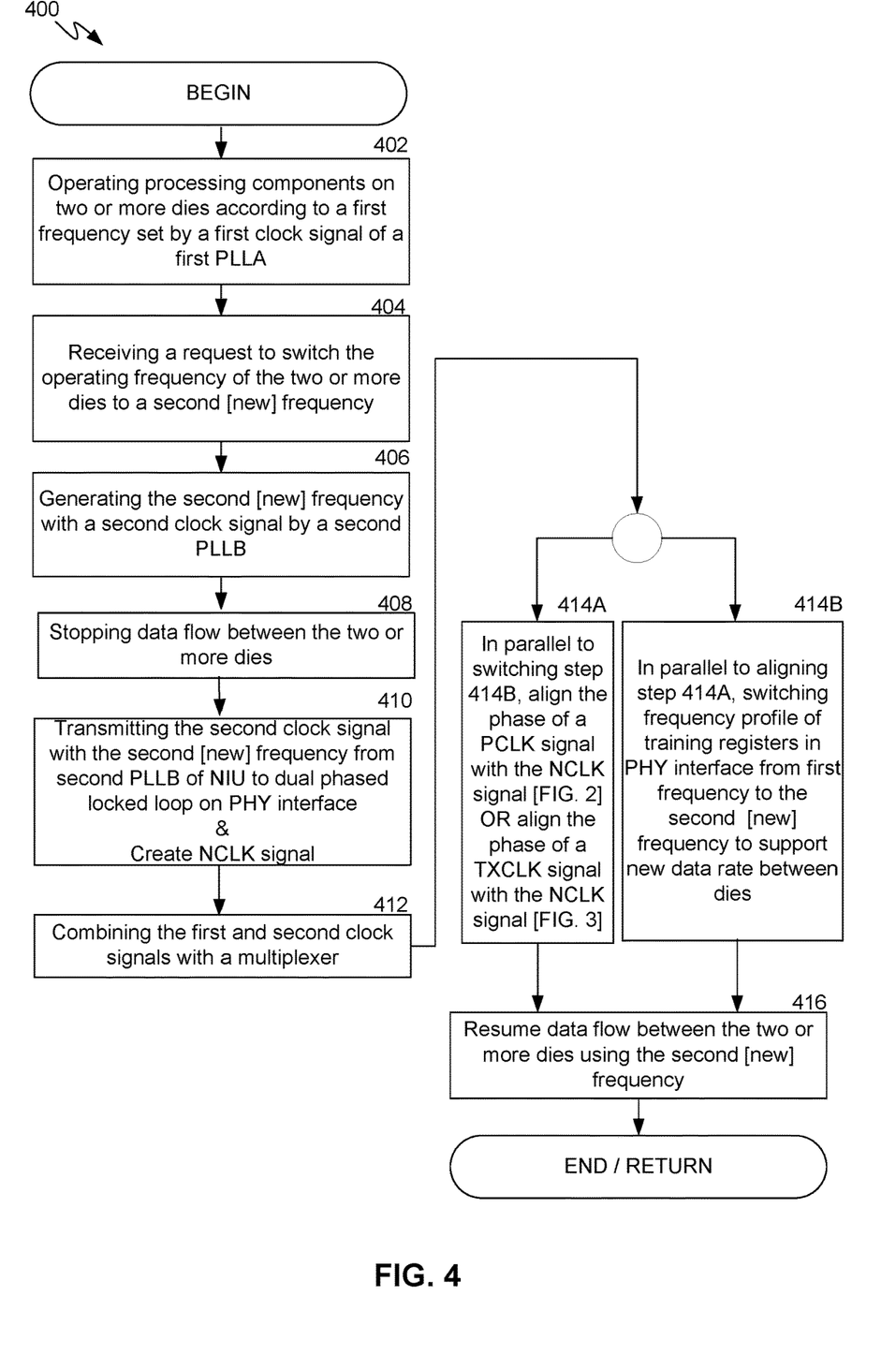
FIG. 4 is a flow diagram illustrating a method for a method for providing a low latency and fast switched cascaded dual phased lock loop (PLL) architecture for die-to-die (D2D)/system-on-chip (Soc) interfaces.

Referring now to FIG. 4, this figure illustrates a method 400 for providing a low latency and fast switched cascaded dual phased lock loop (PLL) architecture for die-to-die (D2D)/system-on-chip (Soc) interfaces, in accordance with exemplary embodiments. Block 402 is the first step of method 400.

In block 402, processing components 104, 137, such as CPU 104 and memory device 137 of FIG. 1, may be operated on two or more dies 105A, 105B on an SoC 502 according to a first frequency set by a first clock signal REFA_CLK 118 of a first PLLA 106A as shown in FIG. 2. Next, in block 404, a request from the central controller 155 is received by the NIU Clockgen 102 of FIG. 2 to switch the operating frequency of the two or more dies 105A to a second, new frequency.

Then, in block 406, the NIU Clockgen 102 generates a second new frequency with a second clock signal REFB_CLK 120 by the second PLLB 106B as shown in FIG. 2. Subsequently, in step 408, the NIU Clockgen 102 stops data flow 117A, 117B between the D2D NIUs 112 and the TX & RX components 114 on all dies 105A, 105B, which in turn, stops all communication data flow among the dies 105A, 105B.

In block 410, once the second PLLB 106B has locked the second clock signal REFB_CLK 120 to the second new frequency, the NIU Clockgen 102 transmits the second clock signal REFB_CLK 120 with the second new frequency to the dual phased locked loop (PLL) architecture on the PHY interface 128. Specifically, the NIU Clockgen 102 transmits the second clock signal REFB_CLK 120 to the multiplexers 108C, 108D of FIG. 2 which are coupled to the second and third phase locked-loops PLLA 106C, 106D. Also in this block 410, the first clock signal REFA_CLK signal 118 and second clock signal REB_CLK 120 are combined with a first multiplexer 108A to create the NCLK signal 122A. The NCLK signal 122A is transmitted to the D2D NIU 112A.

Subsequently, in block 412, the first and second clock signals REFA_CLK 118, REFB_CLK 120 are combined at the second and third multiplexers 108C, 108D as shown in FIG. 2. After block 412, the two blocks 414A and 414B may be performed in parallel. That is, block 414A may be performed/executed at the same time as block 414B, and vice-versa.

In block 414A, for the structure of the system 101 shown in FIG. 2, the PCLK signal 126 generated by the combined signals from the multiplexer 108D and the NCLK signal 122A is divided and aligned with the phase of the NCLK signal 122A. This block 414A corresponds with the divide and align logic block 110 described above in connection with FIG. 2.

For the structure of the system 101' shown in FIG. 3, a TXCLK signal 130 is created from the combined first and second clock signals 118 & 120. An NCLK signal 122A from the second clock signal 120 at the output of the NIU Clockgen 102. And then the TXCLK signal 130 is aligned with the NCLK signal 122C that is fed into the TX & RX component 114A.

In block 414B, a frequency profile of the training registers 140a, 140b of the TX & RX component 114A of the PHY 128A is switched from the first frequency (old) to the second (new) frequency to support the new data rate between the dies 105A, 105B based on the new frequency.

Also in this block 414B, the training circuit blocks 144 may also prepare the registers 140a, 140b for the new operating frequency as described previously. In this block 414B, the clock, data skew, transmitter & receiver impedance settings stored in the registers 140 may be updated 140. The training circuit blocks 144 may assist with the updates to these settings.

Subsequently, in block 416, data flow 117A, 117B between the D2D NIUs 112 and the TX & RX components 114 is resumed. In this block 416, the NIU Clockgen 102 can send a resume data command to each D2D NIU 112 and use the second new clock signal in the TX & RX component 114 (PCLK 126 for FIG. 2, TXCLK 130 for FIG. 3). The method 400 may then end and/or re-start if a next frequency request in block 404 is received.

Certain steps in the processes or process flows described in this specification naturally precede others for the invention to function as described. However, the system and method are not limited to the order of the steps described if such order or sequence does not alter the functionality of the method and system. That is, it is recognized that some steps may performed before, after, or parallel (substantially simultaneously with) other steps without departing from the scope of this disclosure. In some instances, certain steps may be omitted or not performed without departing from the invention. Further, words such as "thereafter", "then", "next", etc. are not intended to limit the order of the steps. These words are simply used to guide the reader through the description of the exemplary method.

Figure 5:
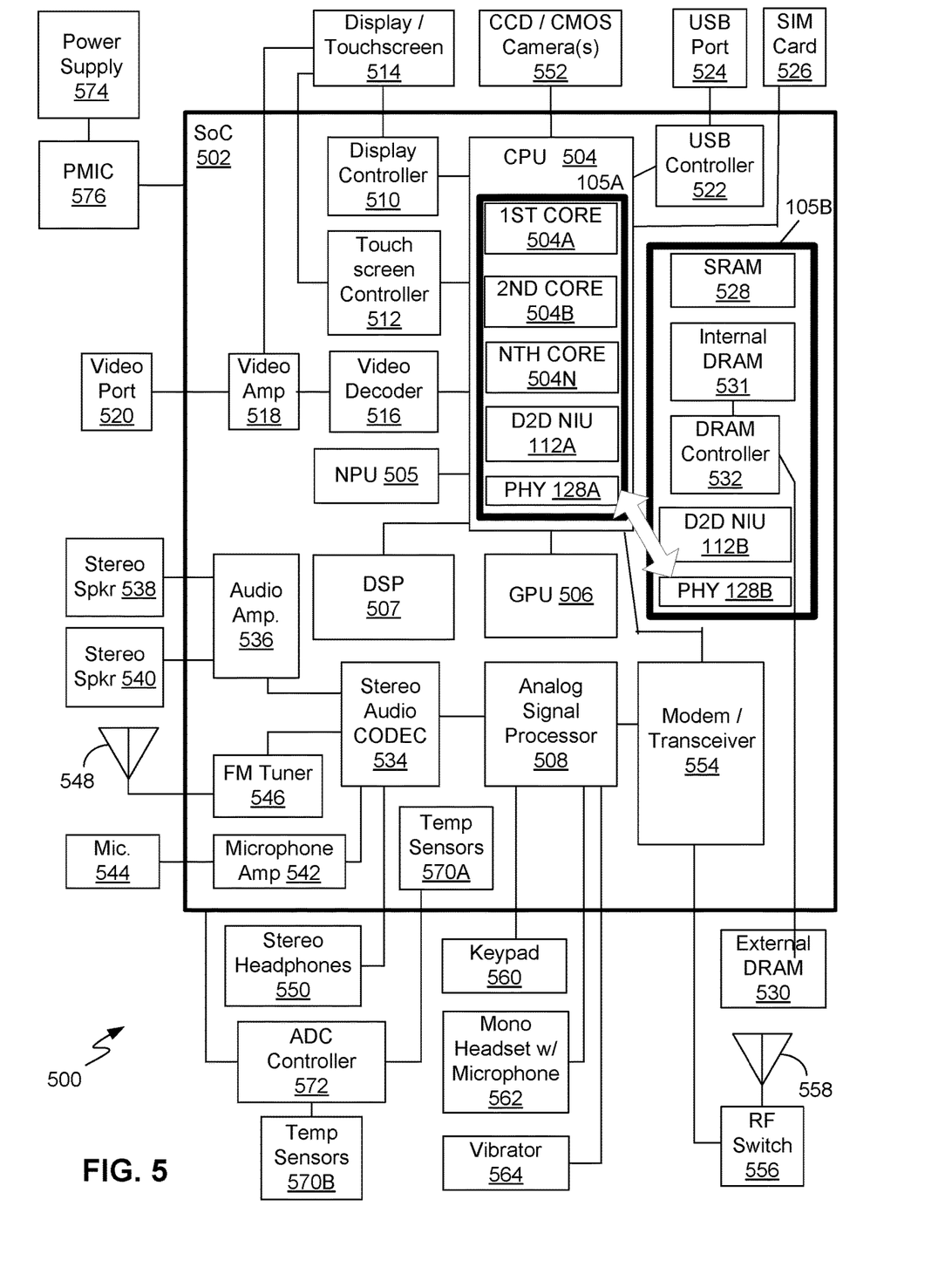
FIG. 5 is block diagram of a portable computing device (PCD) that incorporates the system of FIG. 1 and the method of FIG. 4, in accordance with exemplary embodiments.

Referring now to FIG. 5, this figure is a block diagram of a portable computing device (PCD) 500 that incorporates the system of FIG. 1 and the method of FIG. 4, in accordance with exemplary embodiments. FIG. 5 illustrates an example of a PCD 500, such as a mobile phone or smartphone, in which exemplary embodiments of systems, methods, computer-readable media, and other examples of providing fast switched D2D SoC interfaces.

For purposes of clarity, some interconnects, signals, etc., are not shown in FIG. 5. Although the PCD 500 is shown as an example, other embodiments of systems, methods, computer-readable media, and other examples of providing cache coherency may be provided in other types of computing devices or systems.

The PCD 500 may include an SoC 502. The SoC 502 may include a CPU 504, an NPU 505, a GPU 506, a DSP 507, an analog signal processor 508, a modem/modem subsystem 554, or other processors. The CPU 504 may include one or more CPU cores, such as a first CPU core 504A, a second CPU core 504B, etc., through an Nth CPU core 504N.

The SoC 502 of FIG. 5 is shown to include a first die 105A and a second die 105B, similar to those described above in connection with FIGS. 1-2. The first die 105A is shown to include the first core 504A, second core 504B, Nth core 504N, a D2D NIU 112A, and PHY 128A. This first die 105A may have all the structures shown in FIGS. 1-2 but are not shown here for brevity.

Similarly, the second die 105B of FIG. 5 is shown to include SRAM 528, internal DRAM 531, DRAM controller 532, a D2D NIU 112B, and PHY 128B. The second die 105B of FIG. 5, like the first die 105A of FIG. 5, may also have all the structures shown in FIGS. 1-2 but are not shown in FIG. 5 for brevity. The first and second PHYs 128A, 128B provide for the D2D interface communications, as described above in connection with FIGS. 1-4.

A display controller 510 and a touch-screen controller 512 may be coupled to the CPU 504. A touchscreen display 514 external to the SoC 502 may be coupled to the display controller 510 and the touch-screen controller 512. The PCD 500 may further include a video decoder 516 coupled to the CPU 504. A video amplifier 518 may be coupled to the video decoder 516 and the touchscreen display 514. A video port 520 may be coupled to the video amplifier 518. A universal serial bus ("USB") controller 522 may also be coupled to CPU 504, and a USB port 524 may be coupled to the USB controller 522. A subscriber identity module ("SIM") card 526 may also be coupled to the CPU 504.

One or more memories may be coupled to the CPU 504. The one or more memories may include both volatile and non-volatile memories. Examples of volatile memories include static random access memory ("SRAM") 528 and dynamic random access memory ("DRAM") 530 and 531. Such memories may be external to the SoC 502, such as the DRAM 530, or internal to the SoC 502, such as the DRAM 531. A DRAM controller 532 coupled to the CPU 504 may control the writing of data to, and reading of data from, the DRAMs 530 and 531.

A stereo audio CODEC 534 may be coupled to the analog signal processor 508. Further, an audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542.

A frequency modulation ("FM") radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 504 include one or more digital (e.g., CCD or CMOS) cameras 552.

A modem or RF transceiver 554 may be coupled to the analog signal processor 508 and the CPU 504. An RF switch 556 may be coupled to the RF transceiver 554 and an RF antenna 558. In addition, a keypad 560, a mono headset with a microphone 562, and a vibrator device 564 may be coupled to the analog signal processor 508.

The SoC 502 may have one or more internal or on-chip thermal sensors 570A and may be coupled to one or more external or off-chip thermal sensors 570B. An analog-to-digital converter controller 572 may convert voltage drops produced by the thermal sensors 570A and 570B to digital signals. A power supply 574 and a PMIC 576 may supply power to the SoC 502.

With the system 101 and method 400, the frequency shift operation may only consume approximately 100.0 nanoseconds of downtime at a maximum. This downtime is small enough not to cause any significant disruption in data traffic flow between dies 105A, 105B. Meanwhile, double data rate software systems (DDRSS) as of this writing may require about a 1.0 microsecond of data traffic downtime for a frequency switch. The frequency switch described above in connection with FIGS. 1-4 may be accomplished well in the shadow of DDRSS frequency switches.

While the system 101 and method 400 have been described in connection with a PCD 500, other computing devices are possible and are included within the scope of this disclosure. Other computing devices may include, but are not limited to, computer servers, and desktop computers, just to name a few other types of computing devices which may incorporate the system 101 and method 400 described above.

Implementation examples are described in the following numbered clauses:

1. A method for providing low latency frequency switching between two dies within a computing device, comprising: operating a first processing component on a first die with a first clock signal at a first frequency and operating a second processing component on a second die with the first clock signal at the first frequency; generating a second clock signal having a second, new frequency; creating a third signal from the first and second clock signals and having the second, new frequency; combining the first and second clock signals with a dual phased locked loop architecture in a die interface; creating a fourth signal from the combined first and second clock signals resulting from the dual phased locked loop architecture; and aligning a phase of the fourth signal with the third signal.

2. The method of clause 1, further comprising: receiving a request to switch the first frequency to the second, new frequency.

3. The method of clauses 1-2, wherein the request to switch the first frequency is part of a Dynamic Voltage and Frequency Scaling (DVFS) request.

4. The method of clause 2-3, wherein data flow between the first and second die is stopped after receiving the request.

5. The method of clauses 1-4, wherein the dual phased locked loop architecture in the die interface comprises a plurality of multiplexers.

6. The method of clauses 1-5, wherein the dual phased locked loop architecture in the die interface combines the first and second clock signals with a single multiplexer that produces a signal output.

7. The method of clauses 1-6, wherein the dual phased locked loop architecture in the die interface is a first dual phased locked loop, and generating the second clock signal having the second, new frequency is performed by a second dual phased locked loop architecture that is outside of the die interface on a die.

8. The method of clauses 1-7, further comprising:
in parallel with aligning the phase of the fourth signal with the third clock signal, switching a frequency profile of training registers within the die interface to support a new data rate.

9. The method of clauses 1-8, wherein the first processing component and the second processing component each comprise at least one of: a central processing unit (CPU), a graphics processing unit (GPU), a digital signal processor (DSP), a neural processing unit (NPU), a memory device; and a modem.

10. A system for providing low latency frequency switching between two dies within a computing device, comprising: a first processing component operating on a first die with a first clock signal at a first frequency; a second processing component operating on a second die with the first clock signal at the first frequency; means for generating a second clock signal having a second, new frequency; means for creating a third signal from the first and second clock signals and having the second, new frequency; a dual phased locked loop architecture that combines the first and second clock signals in a die interface; means for creating a fourth signal from the combined first and second clock signals resulting from the dual phased locked loop architecture; and means for aligning a phase of the fourth signal with the third signal.

11. The system of clause 10, further comprising: a controller for issuing a request to switch the first frequency to the second, new frequency.

12. The system of clause 11, wherein the request to switch the first frequency is part of a Dynamic Voltage and Frequency Scaling (DVFS) request.

13. The system of clauses 11-12, wherein the controller stops data flow between the first and second die after issuing the request.

14. The system of clauses 10-13, wherein the dual phased locked loop architecture in the die interface comprises a plurality of multiplexers.

15. The system of clause 14, wherein the dual phased locked loop architecture in the die interface combines the first and second clock signals with a single multiplexer that produces a signal output.

16. The system of clause 10, wherein the dual phased locked loop architecture in the die interface is a first dual phased locked loop, and generating the second clock signal having the second, new frequency is performed by a second dual phased locked loop architecture that is outside of the die interface on a die.

17. The system of clauses 10-16, further comprising: a plurality of training registers having a frequency profile.

18. The system of clauses 10-17, wherein the first processing component and the second processing component each comprise at least one of: a central processing unit (CPU), a graphics processing unit (GPU), a digital signal processor (DSP), a neural processing unit (NPU), a memory device; and a modem.

19. The system of clauses 10-18, wherein the computing device comprises at least one of: a portable computing device (PCD), a computer server, a desktop computer, a laptop computer, and a computer server.

20. The system of clause 19, wherein the PCD comprises at least one of: a hand-held computer, a cellular telephone or smartphone, a portable digital assistant, a portable game console, and a tablet personal computer (PC).

21. A system for providing low latency frequency switching between two dies within a computing device, comprising: a first processing component operating on a first die with a first clock signal at a first frequency; a second processing component operating on a second die with the first clock signal at the first frequency; a first dual phased locked loop architecture outside of a die interface generating a second clock signal having a second, new frequency; a device creating a third signal from the first and second clock signals and having the second, new frequency; and a second dual phased locked loop architecture in the die interface combining the first and second clock signals and creating a fourth signal, the second dual phased locked loop architecture aligning a phase of the fourth signal with the third signal.

22. The system of clause 21, further comprising: a controller for issuing a request to switch the first frequency to the second, new frequency.

23. The system of clause 22, wherein the request to switch the first frequency is part of a Dynamic Voltage and Frequency Scaling (DVFS) request.

24. The system of clauses 22-23, wherein the controller stops data flow between the first and second die after issuing the request.

25. The system of clauses 21-24, wherein the second dual phased locked loop architecture in the die interface comprises a plurality of multiplexers.

26. A system for providing low latency frequency switching between two dies within a computing device, comprising: a first processing component operating on a first die with a first clock signal at a first frequency; a second processing component operating on a second die with the first clock signal at the first frequency; a first device generating a second clock signal having a second, new frequency; a second device creating a third signal from the first and second clock signals and having the second, new frequency; and a dual phased locked loop architecture in a die interface combining the first and second clock signals and creating a fourth signal, the dual phased locked loop architecture aligning a phase of the fourth signal with the third signal.

27. The system of clause 26, wherein the first device also comprises a dual phased locked loop.

28. The system of clauses 26-27, further comprising: a controller for issuing a request to switch the first frequency to the second, new frequency.

29. The system of clause 28, wherein the request to switch the first frequency is part of a Dynamic Voltage and Frequency Scaling (DVFS) request.

30. The system of clauses 26-30, wherein the dual phased locked loop architecture in the die interface comprises a plurality of multiplexers.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for providing low latency frequency switching between two dies within a computing device, comprising:
    operating a first processing component on a first die with a first clock signal at a first frequency and operating a second processing component on a second die with the first clock signal at the first frequency;
    generating a second clock signal having a second, new frequency;
    creating a third signal from the first and second clock signals and having the second, new frequency;
    combining the first and second clock signals with a dual phased locked loop architecture in a die interface;
    creating a fourth signal from the combined first and second clock signals resulting from the dual phased locked loop architecture; and
    aligning a phase of the fourth signal with the third signal.

2. The method of claim 1, further comprising: receiving a request to switch the first frequency to the second, new frequency.

3. The method of claim 2, wherein the request to switch the first frequency is part of a Dynamic Voltage and Frequency Scaling (DVFS) request.

4. The method of claim 2, wherein data flow between the first and second die is stopped after receiving the request.

5. The method of claim 1, wherein the dual phased locked loop architecture in the die interface comprises a plurality of multiplexers.

6. The method of claim 5, wherein the dual phased locked loop architecture in the die interface combines the first and second clock signals with a single multiplexer that produces a signal output.

7. The method of claim 1, wherein the dual phased locked loop architecture in the die interface is a first dual phased locked loop, and generating the second clock signal having the second, new frequency is performed by a second dual phased locked loop architecture that is outside of the die interface on a die.

8. The method of claim 1, further comprising: in parallel with aligning the phase of the fourth signal with the third clock signal, switching a frequency profile of training registers within the die interface to support a new data rate.

9. The method of claim 1, wherein the first processing component and the second processing component each comprise at least one of: a central processing unit (CPU), a graphics processing unit (GPU), a digital signal processor (DSP), a neural processing unit (NPU), a memory device, and a modem.

10. A system for providing low latency frequency switching between two dies within a computing device, comprising:
    a first processing component operating on a first die with a first clock signal at a first frequency;
    a second processing component operating on a second die with the first clock signal at the first frequency;
    means for generating a second clock signal having a second, new frequency;
    means for creating a third signal from the first and second clock signals and having the second, new frequency;
    a dual phased locked loop architecture that combines the first and second clock signals in a die interface;
    means for creating a fourth signal from the combined first and second clock signals resulting from the dual phased locked loop architecture; and
    means for aligning a phase of the fourth signal with the third signal.

11. The system of claim 10, further comprising: a controller for issuing a request to switch the first frequency to the second, new frequency.

12. The system of claim 11, wherein the request to switch the first frequency is part of a Dynamic Voltage and Frequency Scaling (DVFS) request.

13. The system of claim 11, wherein the controller stops data flow between the first and second die after issuing the request.

14. The system of claim 10, wherein the dual phased locked loop architecture in the die interface comprises a plurality of multiplexers.

15. The system of claim 14, wherein the dual phased locked loop architecture in the die interface combines the first and second clock signals with a single multiplexer that produces a signal output.

16. The system of claim 10, wherein the dual phased locked loop architecture in the die interface is a first dual phased locked loop, and generating the second clock signal having the second, new frequency is performed by a second dual phased locked loop architecture that is outside of the die interface on a die.

17. The system of claim 10, further comprising: a plurality of training registers having a frequency profile.

18. The system of claim 10, wherein the first processing component and the second processing component each comprise at least one of: a central processing unit (CPU), a graphics processing unit (GPU), a digital signal processor (DSP), a neural processing unit (NPU), a memory device, and a modem.

19. The system of claim 10, wherein the computing device comprises at least one of: a portable computing device (PCD), a computer server, a desktop computer, a laptop computer, and a computer server.

20. The system of claim 19, wherein the PCD comprises at least one of: a hand-held computer, a cellular telephone or smartphone, a portable digital assistant, a portable game console, and a tablet personal computer (PC).

21. A system for providing low latency frequency switching between two dies within a computing device, comprising:
   a first processing component operating on a first die with a first clock signal at a first frequency;
   a second processing component operating on a second die with the first clock signal at the first frequency;
   a first dual phased locked loop architecture outside of a die interface generating a second clock signal having a second, new frequency;
   a device creating a third signal from the first and second clock signals and having the second, new frequency; and
   a second dual phased locked loop architecture in the die interface combining the first and second clock signals and creating a fourth signal, the second dual phased locked loop architecture aligning a phase of the fourth signal with the third signal.

22. The system of claim 21, further comprising: a controller for issuing a request to switch the first frequency to the second, new frequency.

23. The system of claim 22, wherein the request to switch the first frequency is part of a Dynamic Voltage and Frequency Scaling (DVFS) request.

24. The system of claim 22, wherein the controller stops data flow between the first and second die after issuing the request.

25. The system of claim 21, wherein the second dual phased locked loop architecture in the die interface comprises a plurality of multiplexers.

26. A system for providing low latency frequency switching between two dies within a computing device, comprising:
   a first processing component operating on a first die with a first clock signal at a first frequency;
   a second processing component operating on a second die with the first clock signal at the first frequency;
   a first device generating a second clock signal having a second, new frequency;
   a second device creating a third signal from the first and second clock signals and having the second, new frequency; and
   a dual phased locked loop architecture in a die interface combining the first and second clock signals and creating a fourth signal, the dual phased locked loop architecture aligning a phase of the fourth signal with the third signal.

27. The system of claim 26, wherein the first device also comprises a dual phased locked loop.

28. The system of claim 26, further comprising: a controller for issuing a request to switch the first frequency to the second, new frequency.

29. The system of claim 28, wherein the request to switch the first frequency is part of a Dynamic Voltage and Frequency Scaling (DVFS) request.

30. The system of claim 26, wherein the dual phased locked loop architecture in the die interface comprises a plurality of multiplexers.

* * * * *